(12) United States Patent
Cannard (10) Patent No.: US 12,028,346 B1
(45) Date of Patent: Jul. 2, 2024

(54) PRIVILEGED ACTIVITY MANAGER

(71) Applicant: Stealthbits Technologies LLC, Hawthorne, NJ (US)

(72) Inventor: Martin Cannard, Hawthorne, NJ (US)

(73) Assignee: Netwrix Corporation, Frisco, TX (US)

( * ) Notice: Subject to any disclaimer, the term of this patent is extended or adjusted under 35 U.S.C. 154(b) by 75 days.

(21) Appl. No.: 16/864,906

(22) Filed: May 1, 2020

Related U.S. Application Data (60) Provisional application No. 62/890,950, filed on Aug. 23, 2019.

(51) Int. Cl.
*H04L 9/40* (2022.01)

(52) U.S. Cl.
CPC .......... *H04L 63/102* (2013.01); *H04L 63/083* (2013.01); *H04L 63/104* (2013.01)

(58) Field of Classification Search
CPC ... H04L 63/102; H04L 63/083; H04L 63/104; H04L 29/06; Y10S 707/99939
See application file for complete search history.

(56) References Cited

U.S. PATENT DOCUMENTS

| | | | | |
|---|---|---|---|---|
| 7,653,934 B1* | 1/2010 | Joshi | ................... | G06F 21/6218 726/6 |
| 9,390,255 B2* | 7/2016 | Sharma | ................. | H04L 63/083 |
| 9,838,383 B1* | 12/2017 | Perlmuter | ............. | H04L 63/083 |
| 10,505,943 B2* | 12/2019 | Joshi | ..................... | H04L 63/105 |
| 2007/0016773 A1* | 1/2007 | Perlman | .............. | G06F 21/6218 713/166 |
| 2009/0044020 A1* | 2/2009 | Laidlaw | .................. | H04L 63/08 713/176 |
| 2013/0086658 A1* | 4/2013 | Kottahachchi | ........ | H04L 63/083 726/6 |
| 2013/0298202 A1* | 11/2013 | Warshavsky | ............ | H04L 63/10 726/4 |
| 2014/0330732 A1* | 11/2014 | Grignon | ................. | G06Q 50/01 705/319 |
| 2016/0057151 A1* | 2/2016 | Brock | ..................... | H04L 67/02 726/4 |
| 2016/0092802 A1* | 3/2016 | Theebaprakasam | ....................... | G06Q 10/0631 705/7.12 |
| 2016/0294881 A1* | 10/2016 | Hua | ....................... | H04L 63/102 |
| 2017/0163650 A1* | 6/2017 | Seigel | .................... | H04L 63/102 |
| 2018/0007059 A1* | 1/2018 | Innes | .................. | G06F 21/6218 |
| 2020/0412726 A1* | 12/2020 | Nevatia | .................. | G06N 20/00 |

OTHER PUBLICATIONS

Cao, Yuan, and Lin Yang. "A survey of identity management technology." 2010 IEEE International Conference on Information Theory and Information Security. IEEE, 2010. (Year: 2010).*
Ahsant, Mehran, Jim Basney, and Lennart Johnsson. "Dynamic, context-aware, least-privilege grid delegation." 2007 8th IEEE/ACM International Conference on Grid Computing. IEEE, 2007. (Year: 2007).*

* cited by examiner

*Primary Examiner* — Theodore C Parsons
*Assistant Examiner* — Sameera Wickramasuriya
(74) *Attorney, Agent, or Firm* — Austin Rapp (57) ABSTRACT

A method is described. The method includes adding privileges using discrete modular steps to an account based on a requested activity to be performed during a session. The method also includes logging the account into the session with the added privileges. The method further includes removing the privileges using discrete modular steps from the account after the session.

19 Claims, 8 Drawing Sheets

PRIVILEGED ACTIVITY MANAGER

RELATED APPLICATIONS

This application is related to and claims priority from U.S. Provisional Patent Application No. 62/890,950 entitled "PRIVILEGED ACTIVITY MANAGER," filed on Aug. 23, 2019, which is hereby incorporated by reference herein, in its entirety.

TECHNICAL FIELD

The present disclosure relates generally to computers and computer-related technology. More specifically, the present disclosure relates to a privileged activity manager.

BACKGROUND

The use of electronic devices has become an everyday occurrence in modern society. The use of electronic devices has increased as the cost of electronic devices has declined. The capabilities of electronic devices have also increased and allow people to use electronic devices in many different industries and for many different purposes. For example, electronic devices may be used to perform tasks at home, work or school. One type of an electronic device is a computer.

The technology being used in computers has been improving rapidly. Computers may range from small handheld computing devices to desktop computer systems to large multi-processor computer systems. In some configurations, multiple computers may communicate in a network environment. Network authentication may be performed to secure network resources. For example, a calling device may provide login credentials to an authenticating device in order to access network resources.

In some instances, an attacker may attempt to perform malicious activity in a network environment. For example, an attacker may seek to compromise the authentication procedures of a network environment to access network resources. Benefits may be realized by securing a network through a privileged activity manager.

DETAILED DESCRIPTION

A method is described. The method includes adding privileges using discrete modular steps to an account based on a requested activity to be performed during a session. The method also includes logging the account into the session with the added privileges. The method further includes removing the privileges using discrete modular steps from the account after the session.

The method may also include providing a user with a list of activities to be performed during the session. The privileges may enable a user to perform the requested activity during the session.

The method may also include receiving a selection of a system on which to perform the activity during the session. The privileges may be added to the account using discrete modular steps based further on the selected system.

The method may also include removing privileges from accounts that are not in use using discrete modular steps. The method may also include using a managed password for the account to log into the session in response to receiving a request to perform an activity during the session.

A computing device is also described. The computing device includes a processor, a memory in electronic communication with the processor, and instructions stored in the memory. The instructions are executable to add privileges to an account using discrete modular steps based on a requested activity to be performed during a session. The instructions are also executable to log the account into the session with the added privileges. The instructions are further executable to remove the privileges from the account using discrete modular steps after the session.

A non-transitory, tangible computer-readable medium is also described. The computer-readable medium includes executable instructions for adding privileges to an account using discrete modular steps based on a requested activity to be performed during a session. The computer-readable medium also includes executable instructions for logging the account into the session with the added privileges. The computer-readable medium further includes executable instructions for removing the privileges from the account using discrete modular steps after the session.

Figure 1:
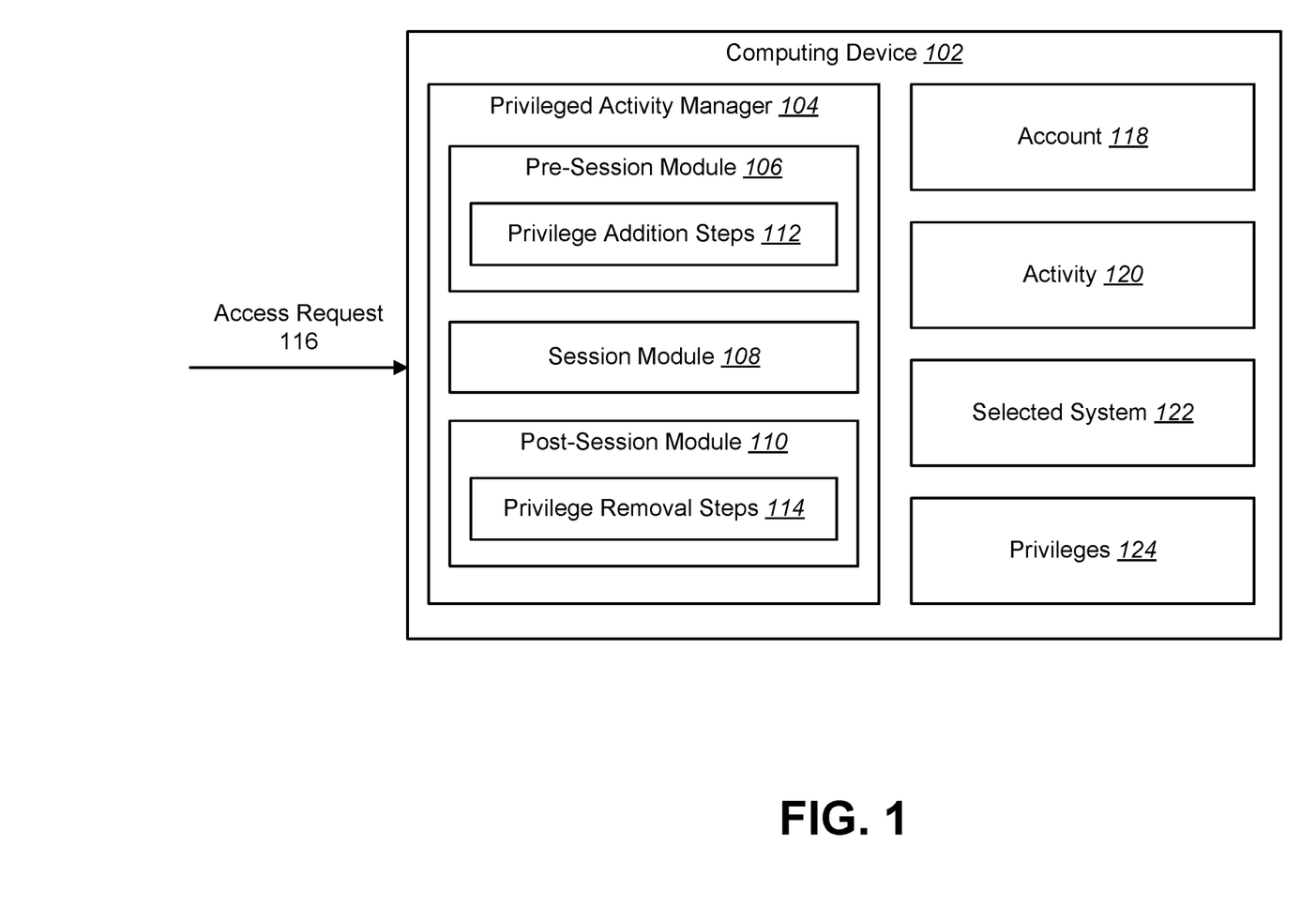
FIG. 1 is a block diagram illustrating one configuration of a network environment in which systems and methods for detecting malicious network activity may be implemented.

FIG. 1 is a block diagram illustrating one configuration of a computing device 102 to implement a privileged activity manager 104. Examples of the computing device 102 include a directory, server, desktop computer, network device, database, laptop computer, workstation, tablet computer, smartphone, etc. Examples of a directory include ACTIVE DIRECTORY and lightweight directory access protocol (LDAP). This may include cloud-based directories or embedded directories in SaaS applications.

Data breach has become commonplace, and despite significant investments in perimeter and endpoint security, breach typically begins at the desktop and server layers of an organization's information technology (IT) infrastructure. A breach may spread through the overabundance of privileged access rights (also referred to as standing privileges or privileges) to each system and other misconfigurations and vulnerabilities that attackers exploit.

While privileged access management (PAM) solutions may address some privileged access problems at the root of every data breach, existing PAM solutions are too expensive and complex for the majority of organizations. Furthermore, PAM solutions may require more time to administer or troubleshoot than an organization can afford.

Additionally, traditional PAM solutions focus on controlling access to accounts 118 and their passwords, not on the activities a user (e.g., an administrator) needs to perform. The result is minimal reduction of an organization's attack surface because the privileged accounts still exist on the endpoint and can still be compromised. Furthermore, PAM vendors may force an organization to buy a full stack of offerings, which is expensive and may be risky to remove and replace.

As used herein, the term "account" includes data used to authenticate a user or computing device on a network and data associated with the account (e.g., privileges). An account 118 may be referred to as a user account. In some examples, an account 118 may include credentials (e.g., username and password) and other information related to a given user and/or computing device.

The privileged activity manager 104 described herein is an activity-based (i.e., task-based) approach, made up of a number of steps, that provides a user (e.g., administrator) of a computing system with the level of privileges 124 needed to perform an activity 120, when the privileges 124 are needed. As used therein, the term "privilege" refers to a delegation of authority to perform an action on a computing device. A privilege 124 may be delegated (e.g., added) to a given account 118 to give that account permission to perform an action or multiple actions on a computing device.

The privileged activity manager 104 described herein may provide privileges 124 (also referred to as permissions) to an account 118 for only as long as the privileges 124 are needed. An account 118 may return to a no-access-by-default state immediately upon completion of the activity 120. The privileged activity manager 104 may provide task-based administrative access and delegation. The privileged activity manager 104 may provide secure, task-based administrative access delivered just-in-time and with just-enough privilege. It should be noted that an activity 120 may be performed on the computing device 102 or another network resource (e.g., a remote computing device).

In an example, the privileged activity manager 104 may include a pre-session module 106. In some examples, the pre-session module 106 may add privileges 124 using discrete modular steps to an account 118 based on a requested activity 120 to be performed during a session. As used herein, the term "discrete modular step" refers to an action that is performed by the computing device 102 (e.g., privileged activity manager 104) to add and/or remove a privilege 124 to an account 118. The action of the "discrete module step" may be discrete in that the action is unique to a requested activity 120. For instance, a given activity 120 may have a number of pre-defined actions to add and/or remove privileges 124 to/from an account 118. Different activities 120 may have distinct actions to add and/or remove privileges 124. The "discrete modular step" may be modular in that changes to actions to add and/or remove privileges 124 for one activity 120 do not impact actions to add and/or remove privileges 124 for other activities 120. Therefore, the steps to add and/or remove privileges 124 may be self-contained for a given activity 120.

The pre-session module 106 may implement one or multiple privilege addition steps 112 to add privileges 124 to an account 118 based on a requested activity 120 to be performed during a session. The privilege addition steps 112 may be discrete modular steps to add privileges 124 for the requested activity 120. For example, the privileged activity manager 104 may receive an access request 116. The access request 116 may be received from a user (e.g., an administrator) or from an automated process. The access request 116 may indicate an account 118 seeking access to a network resource.

As used herein, the term "session" refers to a temporary and interactive information interchange between two or more communicating devices. A "session" may also be referred to as a computing session. During a session, a user or computing device may establish a communication link with a given network resource. In some examples, a user or computing device may be logged into a given network resource (e.g., computing device, database, data stream, folders, files, etc.) during a session. In some examples, a session may be established to implement an activity 120 and once the activity 120 is complete, the session ends.

The privilege addition steps 112 may be determined based on which activity 120 is requested. Different activities 120 may include different privilege addition steps 112. For example, the pre-session module 106 may determine which privileges 124 to add to an account 118 based on a requested activity 120 such as enabling group membership or adding implicit ACTIVE DIRECTORY permissions. For example, a requested activity 120 may include a request to reset password permissions. Other examples of activities 120 include server management, directory management, exchange management, database management, SaaS applications, IaaS management, and/or privileged task automation.

In some examples, the privileged activity manager 104 may provide a user with a list of activities 120 to be performed during the session. For example, the list of activities 120 may be pre-configured activities from which the user selects one or more of the listed activities 120.

The pre-session module 106 may determine which privileges 124 to add to the requesting account 118 based on the activity 120 to be performed. For example, in the pre-session stage, a step may be to remove Kerberos tickets from the selected system 122, thus mitigating the risk of someone performing a pass-the-hash attack. The privileges 124 may enable a user to perform the requested activity 120 during the session. In some examples, the account 118 may be given permissions to perform the activity 120. In other examples, the account 118 may be added to a user group with privileges 124 to perform the activity 120. It should be noted that before the privileges 124 are added to the account 118, the account 118 may have no privileges 124 or may have limited privileges 124.

In some examples, the pre-session module 106 may also receive a selection of a system 122 on which to perform the activity 120 during the session. For example, a user may indicate a system 122 (e.g., computing device and/or network resource) on which the user would like to perform the activity 120. The pre-session module 106 may add the privileges 124 to the account 118 based further on the selected system 122. For example, the pre-session module 106 may determine which privileges 124 will allow the user to perform the activity 120 on the selected system 122. These privileges 124 may then be added to the account 118.

In some examples, the pre-session module 106 may present a list of systems that are available for the requested activity 120. The systems may be listed based on access policy and the selected system 122 passed to the activity 120.

In some examples, the pre-session module 106 may use a managed password for the account 118 to log into the session in response to receiving a request to perform an activity 120 during the session. For example, the pre-session module 106 may access a vault to release a password for the account 118. As used herein, a "vault" is a repository of managed accounts 118. When an account 118 is at rest, nobody knows what the password is. The vault may provide a password for the account 118 for a certain period of time (e.g., 2 hours). At end of the period, the vault may change the password and the user then does not know what the password is. In this approach, nobody knows the password for an account 118 until the account 118 is released for an access control process.

The privileged activity manager 104 may also include a session module 108. The session module 108 may facilitate logging the account 118 into a system using the added privileges 124. For example, the session module 108 may cause a user to be logged into a network resource with the added privileges 124. In other examples, the session module 108 may facilitate establishing a proxy connection through a firewall to a network resource.

The session module 108 may also monitor the session on the given system. For example, the session module 108 may determine whether the account 118 remains active in the session or whether the account 118 has become inactive. In other examples, the session module 108 may protect local groups on a network resource against unauthorized changes.

In some examples, the session module 108 may launch an application associated with the requested activity 120 after the session login. The session module 108 may automatically launch applications and control aspects of the user interaction based on contextual security policy. For example, a system containing sensitive data might only be accessible via the proxy, and the ability to download or copy data is dynamically blocked.

The privileged activity manager 104 may also include a post-session module 110. In some examples, the post-session module 110 may implement privilege removal steps 114 to remove privileges 124 from the account 118 after the session. The privilege removal steps 114 may be discrete modular steps to remove privileges 124 from the account 118 after the session. For example, after the user logs off the session or completes the activity 120, the post-session module 110 may remove the privileges 124 from the account 118. In another example, the post-session module 110 may remove the privileges 124 from the account 118 if the session is cancelled. In other words, the post-session module 110 may remove privileges 124 from accounts 118 that are not in use. Therefore, the privileged activity manager 104 may ensure that the account 118 does not retain privileges 124 that an attacker can get ahold of and leverage. If the attacker gets ahold of that account 118, the account 118 does not have any rights to do anything useful.

In an example of potential steps, the post-session module 110 may purge any Kerberos tickets specifically generated by the user during the session. This may reduce the risk of another person being able to compromise the credentials later on, as part of a pass-the-hash attack.

In some examples, the account 118 may be further secured with multi-factor (e.g., two-factor) authentication. For example, in addition to providing a password to authenticate an access request 116, the privileged activity manager 104 may reference additional evidence (i.e., a factor) to determine that the access request 116 is legitimate. In some examples, the location of the user may be a factor used in the multi-factor authentication.

Figure 5:
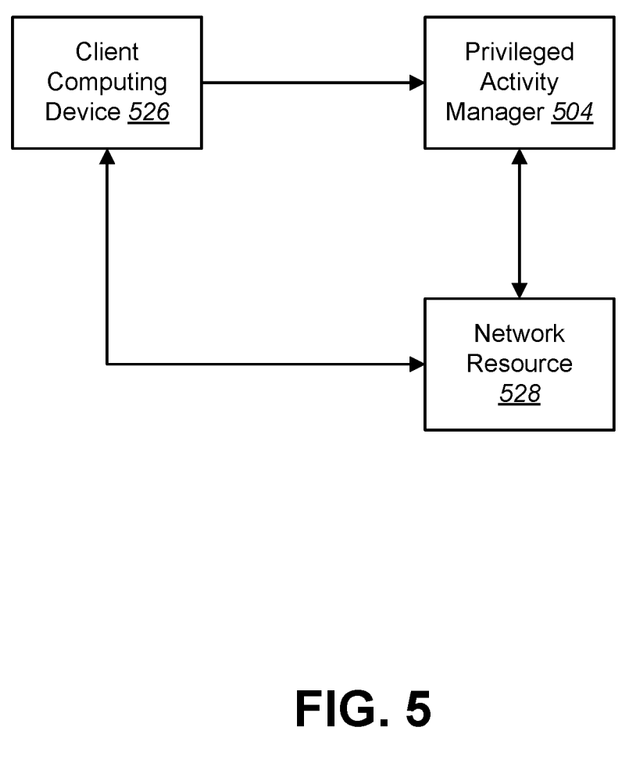
FIG. 5 is a block diagram illustrating an example for direct login of a user using a privileged activity manager.
Figure 6:
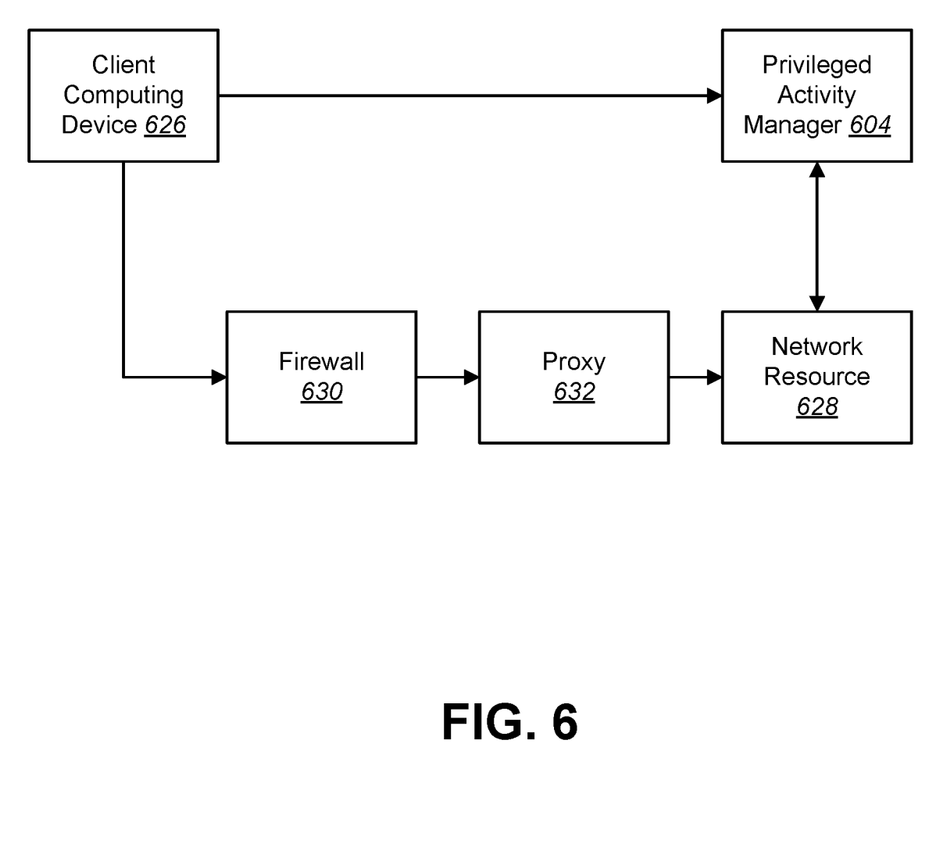
FIG. 6 is a block diagram illustrating an example of automatic login via a proxy 632 across security zones using a privileged activity manager.
Figure 7:
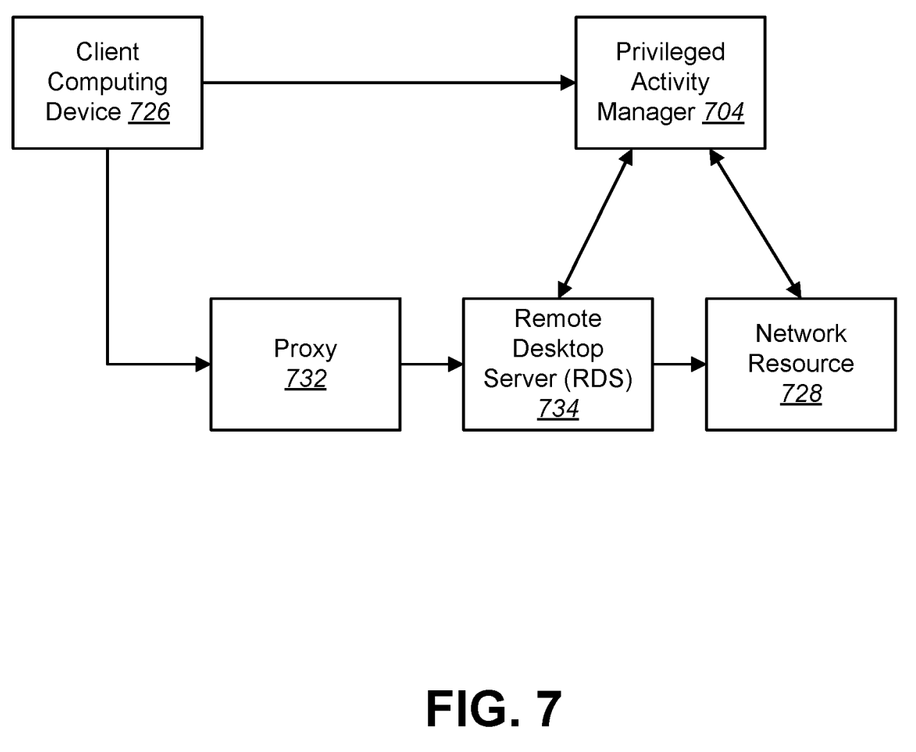
FIG. 7 is a block diagram illustrating an example password reset delegation using a privileged activity manager.

Various examples of privileged activity management are illustrated herein. A first example for direct login of a user using the privileged activity manager is illustrated in FIG. 5. A second example for logging a user into a server without direct access is illustrated in FIG. 6. A third example illustrated in FIG. 7 is a helpdesk use case for reset password delegation.

The privileged activity manager 104 may enable administrators and helpdesk professionals to perform their day-to-day activities easily and without the complexity of traditional PAM tools. The privileged activity manager 104 focuses on controlling the activity 120 to be performed rather than mapping access to an account 118. The result is a reduced attack surface that drastically improves an organization's overall security posture.

The privileged activity manager 104 is a tool that allows administrators to focus on the tasks they need to perform by dynamically allocating a privilege(s) 124 when the task is started and removing the privilege(s) 124 when finished. Furthermore, the privileged activity manager 104 is a tool that enables system administrators to safely and securely do their job while minimizing the attack surface.

The privileged activity manager 104 may securely authenticate every user and adds just-in-time privileges 124 that are appropriate for the requested activity 120. The privileged activity manager 104 may remove the privileges 124 when the activity 120 is complete. This removes the attack surface when accounts 118 are at rest. This also removes the administrative burden of maintaining access control groups.

The privileged activity manager 104 may be suitable for a single server installation within a small organization. The privileged activity manager 104 may also scale to large distributed enterprises (e.g., with thousands of concurrent administrative activities).

The privileged activity manager 104 may provide activity-based sessions to any administrative function, including directories, servers, applications, databases and cloud-based activities 120. The privileged activity manager 104 may provide a zero-trust security architecture to ensure that all privileged access is authenticated. Just-in-time privilege may ensure that the user is granted specific rights to perform the activity 120 at the time it is required, and only until the activity 120 is complete.

Granular task-specific permissions may be assigned to the activity 120 for true least privilege delegation. The accounts 118 may be given specific delegated access for the given activity 120 the user needs to complete. Generic administrative level access may not be necessary.

In some examples, the privileged activity manager 104 is capable of working alongside an organization's existing PAM investment.

In some examples, for ACTIVE DIRECTORY (AD), the privileged activity manager 104 may lock down domain administrative permissions. The locked-down permissions may work with regular or dual accounts 118. The privileged activity manager 104 may clean up a Domain/Enterprise Admin group by allowing administrators to work without Domain Admin rights. The privileged activity manager 104 may provide support for an Admin workstation and two-factor authorization for zero trust security. The privileged activity manager 104 may also provide cross domain AD management regardless of the login domain. The privileged activity manager 104 may further provide an audited delegation to AD.

For operating systems such as WINDOWS, UNIX, and LINUX Systems, the privileged activity manager 104 may lock down Local Server administrative permissions. The privileged activity manager 104 may also support full administrative delegation to local servers.

In some examples, the privileged activity manager 104 may delegate help desk tasks. For example, the privileged activity manager 104 may provide for ACTIVE DIRECTORY task automation. The privileged activity manager 104 may also enable delegation of common tasks such as password reset/unlock, group management, add/remove computers, etc. Additionally, the privileged activity manager 104 may exchange related task delegation to simplify user onboarding such as creating mailboxes, mail server policies, and delivery restrictions.

The privileged activity manager 104 may work with existing security tools. For example, the privileged activity manager 104 may work alongside Local Admin Password Solution (LAPS).

It should be noted that while functions are described in terms of particular modules herein, additional or alternative modules and/or a combination of modules or a sub-part of a module may perform one or more of the functions described herein.

Figure 2:
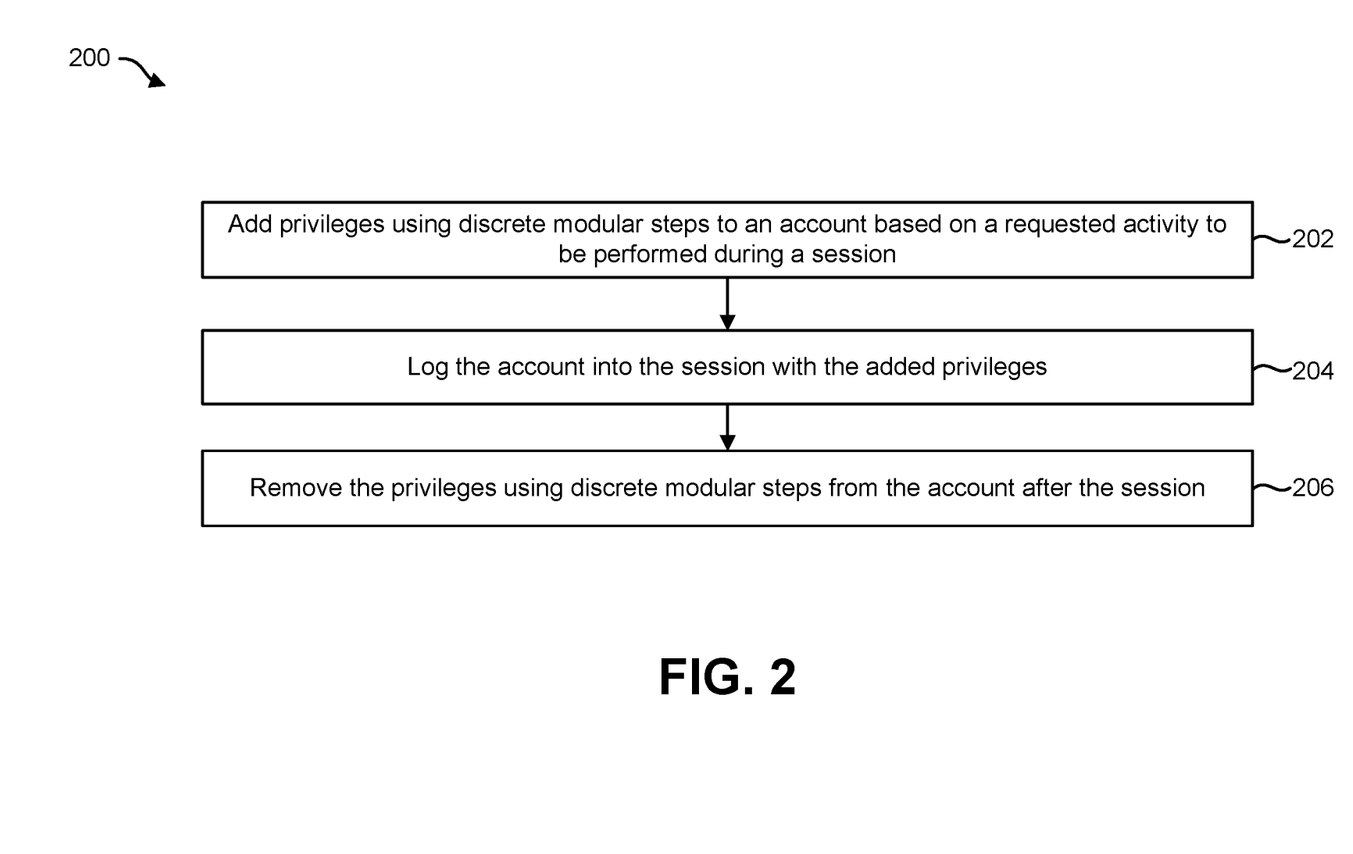
FIG. 2 is a flow diagram illustrating one configuration of a method for network access based on privileged activity.

FIG. 2 is a flow diagram illustrating one configuration of a method 200 for network access based on privileged activity. The method 200 may be implemented by a computing device 102 in a network environment. In an implementation, the computing device 102 may implement a privileged activity manager 104 as described in connection with FIG. 1.

The computing device 102 may add 202 privileges 124 using discrete modular steps to an account 118 based on a requested activity 120 to be performed during a session. In some examples, the discrete modular steps to add 202 privileges 124 may include privilege addition steps 112. For example, the computing device 102 may receive an access request 116. The access request 116 may identify the account 118 of a user seeking access to network resources. In some examples, the computing device 102 may provide a user with a list of activities 120 to be performed during the session in response to receiving the access request 116. The user may select an activity 120 or multiple activities 120 from the list of activities 120. The computing device 102 may add 202 privileges 124 to the account 118 to enable a user to perform the requested activity 120 during the session.

In some examples, the computing device 102 may also receive a selection of a system 122 on which to perform the activity 120 during the session. For example, a user may indicate a system 122 (e.g., computing device and/or network resource) on which the user would like to perform the activity 120. The computing device 102 may add 202 the privileges 124 to the account 118 that will allow the user to perform the activity 120 on the selected system 122.

The computing device 102 may log 204 the account 118 into the session with the added privileges 124. For example, the user may access a selected system 122 with privileges 124 to perform the requested activity 120. In some examples, the computing device 102 may launch an application on the selected system 122 to perform the activity 120.

The computing device 102 may remove 206 the privileges 124 using discrete modular steps from the account 118 after the session. In some examples, the discrete modular steps to remove 206 privileges 124 may include privilege removal steps 114. For example, once the session ends (e.g., the user logs out) or the session is cancelled, the computing device 102 may remove the privileges 124 added to the account 118. Therefore, the computing device 102 may remove privileges 124 from accounts 118 that are not in use.

Figure 3:
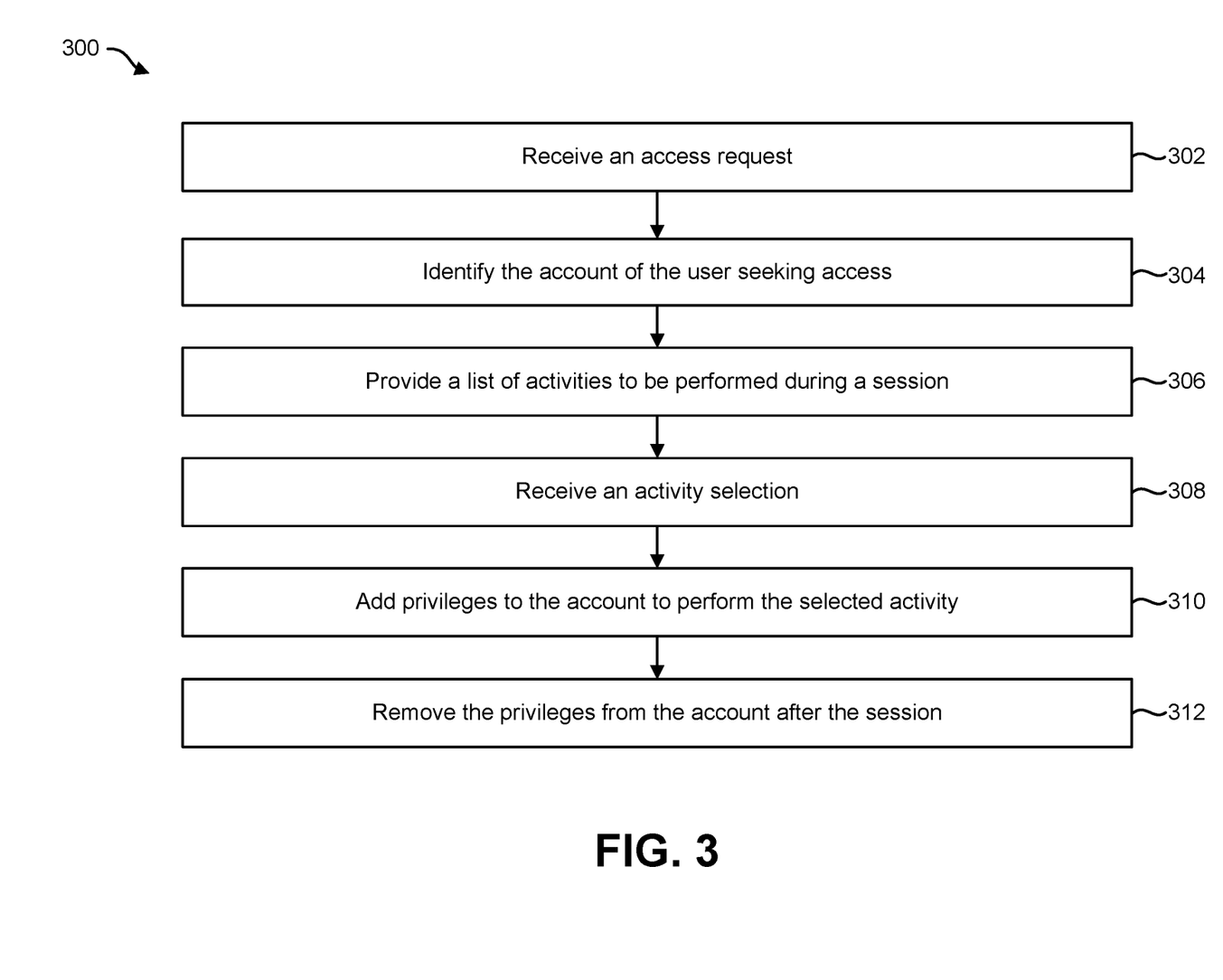
FIG. 3 is a flow diagram illustrating another configuration of a method for network access based on privileged activity.

FIG. 3 is a flow diagram illustrating another configuration of a method 300 for network access based on privileged activity. The method 300 may be implemented by a computing device 102 in a network environment. In an implementation, the computing device 102 may implement a privileged activity manager 104 as described in connection with FIG. 1.

The computing device 102 may receive 302 an access request 116. For example, a user may send an access request 116 to the computing device 102 using a client computing device. Alternatively, the user may be logged into the computing device 102, in which case, the computing device 102 receives 302 the access request 116 directly. The access request 116 may indicate that a user would like to gain access to a network resource to perform an activity 120.

The computing device 102 may identify 304 the account 118 of the user seeking access. For example, the access request 116 may identify the account 118 of the user seeking access to network resources. In some examples, the access request 116 may include credentials (e.g., username and password) of the user's account 118.

The computing device 102 may provide 306 a list of activities 120 to be performed during a session. For example, the list of activities 120 may be pre-configured activities from which the user selects one or more of the listed activities 120. In some examples, the list of activities 120 may include resetting password permissions, server management, directory management, exchange management, database management, SaaS applications, IaaS management, and/or privileged task automation. It should be noted that these examples are not an exhaustive list of possible activities 120 that may be provided 306.

In some examples, the list of activities 120 may be provided 306 to a user through graphical user interface (GUI) elements. For example, the computing device 102 may generate a dropdown list of activities 120 that a user may select. Other GUI elements may be used to provide 306 the list of activities 120.

The computing device 102 may receive 308 an activity selection. For example, a user may interact with the GUI element to select an activity 120. In some examples, the computing device 102 may receive multiple activity selections corresponding to multiple activities 120 that a user would like to perform in a session.

The computing device 102 may add 310 privileges 124 to the account 118 to perform the selected activity 120. For example, the computing device 102 may perform pre-configured privilege addition steps 112 to add privileges 124 associated with the selected activity 120 to the account 118 to enable a user to perform the requested activity 120 during the session. In some examples, the account 118 may be given permissions to perform the activity 120. In other examples, the account 118 may be added to a user group with privileges 124 to perform the activity 120. It should be noted that before the privileges 124 are added 310 to the account 118, the account 118 may have no privileges 124.

The computing device 102 may remove 312 the privileges 124 from the account 118 after the session. For example, once the session ends (e.g., the user logs out) or the session is cancelled, the computing device 102 may remove 312 the privileges 124 added to the account 118. Therefore, the computing device 102 may remove 312 privileges 124 from accounts 118 that are not in use.

Figure 4:
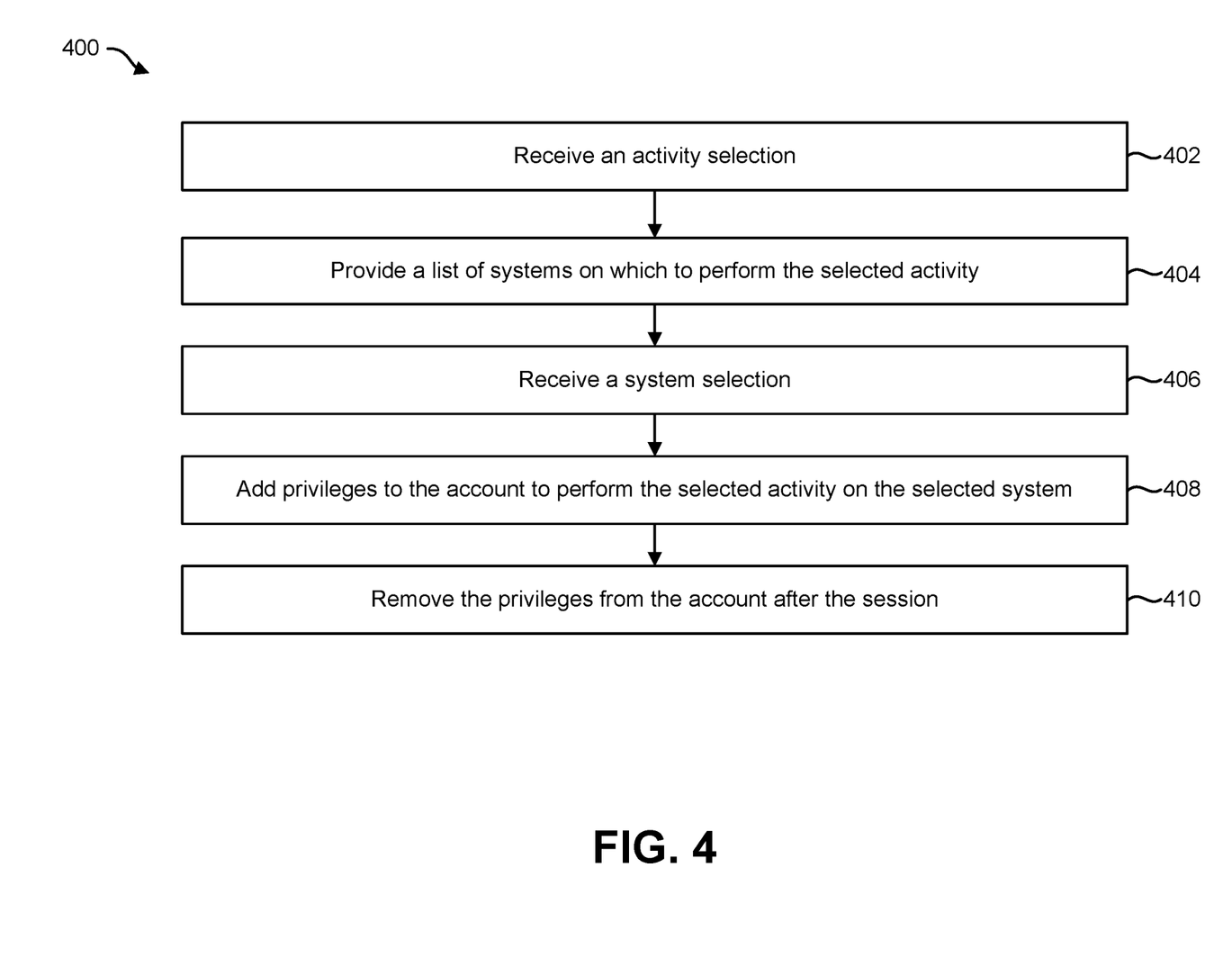
FIG. 4 is a flow diagram illustrating yet another configuration of a method for network access based on privileged activity.

FIG. 4 is a flow diagram illustrating yet another configuration of a method 400 for network access based on privileged activity. The method 400 may be implemented by a computing device 102 in a network environment. In an implementation, the computing device 102 may implement a privileged activity manager 104 as described in connection with FIG. 1.

The computing device 102 may receive 402 an activity selection. For example, this may be accomplished as described in connection with FIG. 3.

The computing device 102 may provide 404 a list of systems on which to perform the selected activity 120. In some examples, the list of systems may include network resources that may be used to perform the selected activity 120. The systems may be listed based on access policy.

In some examples, the list of systems may be provided 404 to a user through graphical user interface (GUI) elements. For example, the computing device 102 may generate a dropdown list of systems that a user may select. Other GUI elements may be used to provide 306 the list of systems.

The computing device 102 may receive 406 a system selection. For example, a user may interact with the GUI element to select a system 122. In some examples, the computing device 102 may receive multiple system selections corresponding to multiple systems 122 on which a user would like to perform an activity 120 in a session.

The computing device 102 may add 408 privileges 124 to the account 118 to perform the selected activity 120 on the selected system 122. For example, the computing device 102 may perform pre-configured privilege addition steps 112 to add privileges 124 associated with the selected activity 120 to the account 118 to enable a user to perform the requested activity 120 on the selected system 122 during the session.

The computing device 102 may remove 410 the privileges 124 from the account 118 after the session. For example, once the session ends (e.g., the user logs out) or the session is cancelled, the computing device 102 may remove 410 the privileges 124 added to the account 118. Therefore, the computing device 102 may remove 410 privileges 124 from accounts 118 that are not in use.

FIG. 5 is a block diagram illustrating an example for direct login of a user using a privileged activity manager 504. In this example, a user may be logged into a client computing device 526. For example, the user may be an administrator on a network. The user may need access to a network resource 528 (e.g., a server). The user may request access to the network resource 528 by sending an access request via the privileged activity manager 504. In some examples, the privileged activity manager 504 may be implemented in accordance with the privileged activity manager 104 described in FIG. 1.

In this example, the user may wish to perform an activity on the network resource 528. The activity may be submitted in the access request or may be provided through a list of activities presented by the privileged activity manager 504.

The privileged activity manager 504 may perform authentication of the user. For example, the privileged activity manager 504 may check the credentials of the user logged into the client computing device 526 to determine that the user is authorized to perform the requested activity.

After authorization, the privileged activity manager 504 may add the user account to a local administrators group on the network resource 528. The user may directly log into a session on the network resource 528 with administrative rights. The privileged activity manager 504 may monitor the session for logon activity. The privileged activity manager 504 may also protect local groups on the network resource 528 against unauthorized changes. The privileged activity manager 504 may further log the user out and remove privileges at the end of the session or if the session is cancelled. It should be noted that in this example there is no privileged account when at rest (e.g., when the user is not logged into a session on a network resource 528). Therefore, there is no attack surface.

FIG. 6 is a block diagram illustrating an example of automatic login via a proxy 632 across security zones using a privileged activity manager 604. In this example, a user may be logged into a client computing device 626. For example, the user may be an administrator on a network. The user may need access to a network resource 628 (e.g., a server) as described in FIG. 5. However, in this case, the network resource 628 may be located behind a firewall 630.

The user may request access to the network resource 628 by sending an access request via the privileged activity manager 604. The privileged activity manager 604 may perform authentication of the user. After authorization, the privileged activity manager 604 may add the user account to a local administrators group on the network resource 628.

The privileged activity manager 604 may cause the user (e.g., via the client device 626) to automatically connect to a proxy 632 behind the firewall 630. The proxy 632 may connect to the network resource 628 using the managed account established by the privileged activity manager 604.

During a session on the network resource 628, the privileged activity manager 604 may monitor the session for logon activity. The privileged activity manager 604 may also protect local groups on the network resource 628 against unauthorized changes. The privileged activity manager 604 may further log the user out and remove privileges at the end of the session or if the session is cancelled. It should be noted that in this example there is no privileged account when at rest (e.g., when the user is not logged into a session on a network resource 628). Therefore, there is no attack surface.

FIG. 7 is a block diagram illustrating an example password reset delegation using a privileged activity manager 704. In this example, a user may be logged into a client computing device 726. For example, the user may be an administrator on a network. For instance, the user may be a helpdesk administrator that needs to reset an ACTIVE DIRECTORY user account. Therefore, the network resource 728 may be a server hosting ACTIVE DIRECTORY.

The user may request access to the network resource 728 by sending an access request via the privileged activity manager 704. The privileged activity manager 704 may perform authentication of the user. After authorization, the privileged activity manager 704 may give the user account the reset password right (i.e., privilege) to user objects in the Admin organizational unit (OU) in ACTIVE DIRECTORY.

The privileged activity manager 704 may launch a management console (e.g., ACTIVE DIRECTORY USERS AND COMPUTERS (ADUC)) on the client device 726 through a proxy 732. The privileged activity manager 704 may also automatically log the user account onto a remote desktop server (RDS) 734. The proxy 732 may connect to the remote desktop server 734 using the managed account established by the privileged activity manager 704. The RDS 734 may then connect to the network resource 728 (e.g., ACTIVE DIRECTORY).

During a session on the network resource 728, the privileged activity manager 704 may monitor the session for logon activity. The privileged activity manager 704 may also protect local groups on the network resource 728 against unauthorized changes. The privileged activity manager 704 may further log the user out and remove privileges at the end of the session or if the session is cancelled. For example, all ACTIVE DIRECTORY rights may be removed from the user account when the account is not in active use.

Figure 8:
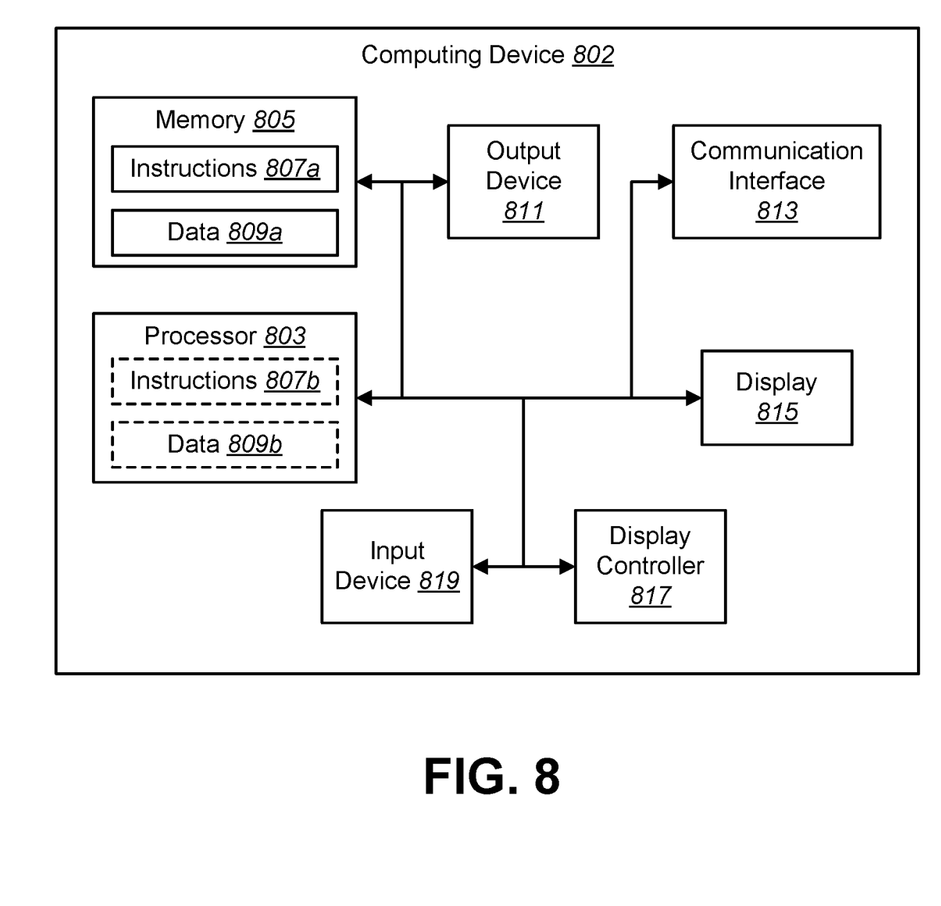
FIG. 8 is a block diagram illustrating components that may be utilized by a computing device.

FIG. 8 is a block diagram illustrating components that may be utilized by a computing device 802. The computing device 802 may be configured in accordance with the computing devices 102 described herein.

The computing device 802 may communicate with other electronic devices through one or more communication interfaces 813. Communication through the communication interface 813 may be achieved through different methods such as wired communication, wireless communication or both wired and wireless communication. For example, the communication interface 813 may be a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter and so forth.

The computing device 802 may receive and transmit information through one or more input devices 819 and one or more output devices 811. The input devices 819 may be a keyboard, mouse, microphone, remote control device, button, joystick, trackball, touchpad, lightpen, etc. The output devices 811 may be a speaker, printer, etc. A display device 815 is an output device that may be included in a computer system. Display devices 815 may project information through different technologies, such as liquid crystal display (LCD), light-emitting diode (LED), gas plasma, electroluminescence, a cathode ray tube (CRT) or the like.

A processor 803 controls the operation of the computing device 802 and may be a microprocessor, a microcontroller, a digital signal processor (DSP) or other device known in the art. A memory 805 may be included in the computing device 802 and includes instructions 807a and data 809a to assist the processor 803 in operating the computing device 802. The memory 805 may send program instructions 807b and/or data 809b to the processor 803 in order for the processor 803 to perform logical and arithmetic operations according to methods disclosed herein. The processor 803 may execute one or more of the instructions stored in the memory 805 to implement one or more of the systems and methods disclosed herein.

Data 809a stored in the memory 805 may be converted to text, graphics and/or moving images (as appropriate) by a display controller 817. Of course, FIG. 8 illustrates only one possible configuration of a computing device 802. Various other architectures and components may be utilized.

In an implementation, the computing device 802 may be a headless server. For example, the computing device 802 may be configured to provide services to other computing devices with or without peripheral input/output interfaces.

In another implementation, the computing device 802 may be configured to run on desktop and server hardware, both physical and virtual. In yet another implementation, the computing device 802 may be configured to run desktop and server operating systems (e.g., MICROSOFT WINDOWS, UNIX, LINUX, etc.).

In this application, various terms have been connected to reference numbers. The reference numbers are for an element in the one or more Figures. If a term is not connected to a reference number, the term is meant more generally and without limitation to any particular Figure.

In this application, the term "determining" has been used. The term "determining" is meant to cover several different actions and, therefore, some examples of "determining" are computing, calculating, processing, investigating, looking up (e.g., looking up in a table, a database or another data structure), ascertaining and the like. The term "determining" also covers resolving, selecting, choosing, establishing and the like. The term "determining" can also cover receiving information or accessing information.

In this application, the term "based on" means more than "based only on," except where expressly stated. The term "based on" describes both "based only on" and "based at least on."

In this application, the term "processor" is meant to be broadly interpreted and covers a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may also be a combination of several processing devices, e.g., a combination of a DSP and a microprocessor, a plurality of microprocessors, one or more microprocessors in conjunction with a DSP core, or any other such configuration.

In this application, the term "memory" is meant to be broadly interpreted and covers electronic storage devices capable of storing information electronically. The term "memory" covers various types of memory technology such as programmable read-only memory (PROM), random access memory (RAM), read-only memory (ROM); erasable programmable read only memory (EPROM), non-volatile random access memory (NVRAM), electrically erasable PROM (EEPROM), flash memory, magnetic or optical data storage, registers, etc. A processor and memory are in electronic communication, where the processor can read or write information located within the memory. Memory that is integral to a processor is in electronic communication with the processor.

In this application, the terms "instructions" and "code" are meant to be broadly interpreted and cover code or statements that are computer-readable. For example, the terms "instructions" and "code" may cover programs, routines, sub-routines, functions, procedures, etc. of assembly language code or intermediate language code.

In this application, the term "computer-readable medium" covers any available medium that a computer or processor can access. For example, a computer-readable medium may comprise optical disk storage such as RAM, ROM, EEPROM, CD-ROM, any magnetic disk storage devices, or any other medium for carrying or storing instructions and code that can be accessed by a computer or processor. A computer-readable medium may be non-transitory and tangible. The terms "disk" and "disc" cover compact disc (CD), laser disc, optical disc, digital versatile disc (DVD), floppy disk and Blu-ray® disc disks typically are used for data magnetically accessible, and discs typically are used for data optically accessible through lasers.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

Instructions and code may be transmitted over a transmission medium. Instructions and code may also be called software. For example, software may be transmitted from a website, server, or other remote source. The transmission medium may be a coaxial cable, fiber optic cable, twisted pair, digital subscriber line (DSL), or wireless technologies such as infrared, radio, and microwave.

In this application, the methods comprise steps or actions for achieving the functions and processes described above. The method steps are to be understood as interchangeable with one another. The interchanging of a step is not to be understood as departing from the scope of the claims. In this application, the order of steps and actions may be modified and not depart from the scope of the claims, unless a specific order is stated for the steps or actions being described.

The claims are to be understood to not be limited to the exact configuration and components discussed above. The claims are to be understood to cover any reasonable modifications, changes and variations of the arrangement, operation and details of the systems, methods, and apparatus described herein.

What is claimed is:

1. A method, comprising:
   receiving, from a user, a first selection of a first activity to be performed;
   adding first just-in-time privileges using discrete modular steps to an account based on the first activity to be performed during a session, wherein the adding is performed dynamically on the account when the user selects the first activity;
   logging the account into the session with the first added just-in-time privileges;
   removing the first just-in-time privileges using discrete modular steps from the account after the first activity is performed, wherein the first just-in-time privileges are self-contained for the first activity and do not impact actions to add privileges for a second activity;
   receiving, from the user during the same session, a second selection of the second activity to be performed, wherein the first activity is different from the second activity;
   adding second just-in-time privileges using discrete modular steps based on the second activity to be performed, wherein the adding second just-in-time privileges is performed dynamically when the user selects the second activity; and
   removing the second just-in-time privileges using discrete modular steps after the second activity is performed, wherein the second just-in-time privileges are self-contained for the second activity and do not impact actions to add privileges for the first activity.

2. The method of claim 1, further comprising providing the user with a list of activities to be performed during the session.

3. The method of claim 1, wherein the first or second just-in-time privileges enable the user to perform the first or second activity during the session.

4. The method of claim 1, further comprising:
   receiving a selection of a system on which to perform the first or second activity during the session; and
   adding the first or second just-in-time privileges to the account using discrete modular steps based further on the selected system.

5. The method of claim 1, further comprising removing privileges from accounts that are not in use using discrete modular steps.

6. The method of claim 1, further comprising using a managed password for the account to log into the session in response to receiving a request to perform the first activity during the session.

7. A computing device, comprising:
   a processor;
   a memory in electronic communication with the processor;
   instructions stored in the memory, the instructions being executable to:
   receive, from a user, a first selection of a first activity to be performed;
   add first just-in-time privileges to an account using discrete modular steps based on the first activity to be performed during a session, wherein the adding is performed dynamically on the account when the user selects the first activity;
   log the account into the session with the first added just-in-time privileges;
   remove the first just-in-time privileges from the account using discrete modular steps after the first activity is performed, wherein the first just-in-time privileges are self-contained for the first activity and do not impact actions to add privileges for a second activity;
   receive, from the user during the same session, a second selection of the second activity to be performed, wherein the first activity is different from the second activity;
   add second just-in-time privileges using discrete modular steps based on the second activity to be performed, wherein the adding second just-in-time privileges is performed dynamically when the user selects the second activity; and
   remove the second just-in-time privileges using discrete modular steps after the second activity is performed, wherein the second just-in-time privileges are self-contained for the second activity and do not impact actions to add privileges for the first activity.

8. The computing device of claim 7, further comprising instructions to automatically launch and control applications to be performed during the session.

9. The computing device of claim 7, wherein the first or second just-in-time privileges enable the user to perform the first or second activity during the session.

10. The computing device of claim 7, further comprising instructions to:
    receive a selection of a system on which to perform the first or second activity during the session; and
    add the first or second just-in-time privileges to the account using discrete modular steps based further on the selected system.

11. The computing device of claim 7, further comprising instructions to remove privileges from accounts that are not in use using discrete modular steps.

12. The computing device of claim 7, further comprising instructions to use a managed password for the account to log into the session in response to receiving a request to perform the first activity during the session.

13. A non-transitory, tangible computer-readable medium, comprising executable instructions for:
    receiving, from a user, a first selection of a first activity to be performed;
    adding first just-in-time privileges to an account using discrete modular steps based on the first activity to be performed during a session, wherein the adding is performed dynamically on the account when the user selects the first activity;
    logging the account into the session with the first added just-in-time privileges;
    removing the first just-in-time privileges from the account using discrete modular steps after the first activity is performed, wherein the first just-in-time privileges are self-contained for the first requested activity and do not impact actions to add privileges for a second activity;

receiving, from the user during the same session, a second selection of the second activity to be performed, wherein the first activity is different from the second activity;

adding second just-in-time privileges using discrete modular steps based on the second activity to be performed, wherein the adding second just-in-time privileges is performed dynamically when the user selects the second activity; and removing the second just-in-time privileges using discrete modular steps after the second activity is performed, wherein the second just-in-time privileges are self-contained for the second activity and do not impact actions to add privileges for the first activity.

14. The computer-readable medium of claim 13, further comprising executable instructions for providing the user with a list of activities to be performed during the session.

15. The computer-readable medium of claim 13, wherein the first or second just-in-time privileges enable the user to perform the first or second activity during the session.

16. The computer-readable medium of claim 13, further comprising executable instructions for:

receiving a selection of a system on which to perform the first or second activity during the session; and adding the first or second just-in-time privileges to the account using discrete modular steps based further on the selected system.

17. The computer-readable medium of claim 13, further comprising executable instructions for removing privileges from accounts that are not in use using discrete modular steps.

18. The computer-readable medium of claim 13, further comprising executable instructions for using a managed password for the account to log into the session in response to receiving a request to perform the first activity during the session.

19. The computing device of claim 7, wherein the instructions are further executable to remove a kerberos ticket.

* * * * *